United States Patent [19]
Matsumoto

[11] Patent Number: 6,086,262
[45] Date of Patent: Jul. 11, 2000

[54] ROLLING BEARING

[75] Inventor: Yoichi Matsumoto, Kanagawa, Japan

[73] Assignee: NSK Ltd., Tokyo, Japan

[21] Appl. No.: 09/238,784

[22] Filed: Jan. 27, 1999

[30] Foreign Application Priority Data

Feb. 24, 1998 [JP] Japan .................................. 10-042453

[51] Int. Cl.⁷ .............................. F16C 33/36; F16C 33/58
[52] U.S. Cl. ........................... 384/571; 384/450; 384/569
[58] Field of Search ..................................... 384/450, 492, 384/564, 565, 569, 571

[56] References Cited

U.S. PATENT DOCUMENTS

| | | | |
|---|---|---|---|
| 1,727,576 | 9/1929 | Umstattd | 384/571 |
| 3,827,771 | 8/1974 | Fernlund | 384/564 |
| 4,802,775 | 2/1989 | Takata | 384/450 |
| 4,877,340 | 10/1989 | Hoeprich | 384/571 |
| 5,007,747 | 4/1991 | Takeuchi et al. | 384/450 |
| 5,921,685 | 7/1999 | Isimaru et al. | 384/564 |

Primary Examiner—Thomas R. Hannon
Attorney, Agent, or Firm—Sughrue, Mion, Zinn, Macpeak & Seas, PLLC

[57] ABSTRACT

A rolling bearing satisfies at least one of following requirements(1)–(4). (1) The radius $r_c$ of curvature at the joint between the head portion and the chamfered portion of said rolling element shall be not less than 0.2 mm. (2) The roughness $(\sigma_1^2+\sigma_2^2)^{1/2}$ resulting from the central line average roughness $\sigma_1$ of the head portion of said rolling element and the central line average roughness $\sigma_2$ of the main collar surface of the bearing ring shall be not more than 0.3 $\mu$mRa. (3) The dimension $y_c$ of the chamfered portion lying between the head portion and the rolling surface of said rolling element in the direction along the diameter of said rolling element shall be not less than the height $y_k$ of the border line in the relief groove on the main collar surface of the bearing ring from the surface of the track. (4) The radius $r_k$ of curvature at the joint between the main collar surface and the chamfered portion of the bearing ring shall be not less than 0.2 mm. Accordingly, the life of a bearing in operation lubricated with a lubricant contaminated by water can be drastically prolonged.

19 Claims, 8 Drawing Sheets

ROLLING BEARING

BACKGROUND OF THE INVENTION

The present invention relates to a rolling bearing comprising an outer ring, an inner ring and a rolling element rotatably disposed therebetween. The rolling bearing may further comprises a cage. More particularly, the present invention relates to a rolling bearing which can work for a prolonged life time even if it is placed under an environment liable to contamination of lubricant by water content.

It is known that a rolling bearing normally exhibits a drastically deteriorated durability when the lubricant used is contaminated by water content. For example, it was reported that the fatigue life of a rolling bearing shows a drop of from a fraction to about one twentieth when the lubricant used is contaminated by water content in an amount of 6% as compared with when the lubricant is free of water content (Kyozaburo Yoshimura, Shinichi Shirota, Kiyoshi Hirakawa, "Rolling fatigue of surface starting point and inner starting point", NSK Bearing Journal, NO. 636, pp. 1–10, 1977 (hereinafter referred to as "Reference 1")).

It is obvious from Reference 1 that the contamination of lubricant by water content has a great effect on the life (durability) of rolling bearing. Thus, various techniques for preventing the contamination of lubricant by water content have heretofore been studied and developed according to the foregoing purpose of rolling bearing.

An example of rolling bearing which is used on the supposition that the lubricant can be contaminated by water content is a work rolling bearing for steel material rolling mill. In the prior art, the work rolling bearing is incorporated in a chock (bearing box) fitted with a contact rubber seal to prevent the entrance of a large amount of rolling water into the chock (bearing box) and hence the contamination of the lubricant sealed in the bearing by water content. However, when the contact rubber seal is deteriorated or damaged, water enters into the chock (bearing box), resulting in the contamination of the lubricant in the bearing by water content. In recent years, therefore, a technique in which a contact rubber seal is fit to the interior of a bearing as well as the exterior of the bearing to avoid the contamination of the lubricant by water content has been proposed (K. YAMAMOTO, M. YAMAZAKI, M. AKIYAMA, K. FURUMURA, "Introducing of Sealed Bearings for Work Roll Necks in Rolling Mills", Proceedings of the JSLE International Tribology Conference, pp. 609–614, Jul. 8–10, 1985, Tokyo, Japan (hereinafter referred to as "1st Prior Art")).

According to 1st Prior Art, the combined use of a contact rubber seal fitted in the chock (bearing box) outside the bearing and a contact rubber seal fitted in the interior of the bearing makes it possible to reduce the water concentration in the lubricant from 40% to less than 10% and the consumption of the lubricant to 1/200 as compared with the case where the entrance of water content is prevented only by a contact rubber seal fitted in the chock (bearing box). It is also reported that this arrangement resulted in the reduction of breakage of bearing to none as compared with the prior art, where several such accidents have been reported every year.

As another technique for preventing the contamination of the lubricant in the foregoing work roll bearing by water content there has been proposed a technique involving the supply of a lubricant into the chock (bearing box) with compressed air as a carrier gas (NSK Technical Journal No. 654, pp. 54–56, 1992 (hereinafter referred to as "2nd Prior Art")).

In accordance with 2nd Prior Art, the predetermination of the air pressure in the chock (bearing box) to a high value by the use of compressed air makes it possible to inhibit the contamination of the lubricant by water content.

The foregoing 1st Prior Art allows the reduction of the water concentration in the lubricant from 40% to less than 10% and the consumption of the lubricant as mentioned above. The results of use of work roll bearings have been studied. As a result, it was made obvious that the occurrence of seizing is drastically reduced but the working time which can last until peeling occurs, i.e., life L of the bearing is not improved too much. The reason for the reduction of occurrence of seizing is that the contact rubber seal incorporated in the bearing allows the reduction of the leakage of the lubricant to the exterior. The reason why the life F of the bearing is not improved too much is that the contamination of the lubricant by water content causes a drastic reduction of the resistance of the bearing to rolling fatigue.

It is reported that even when the lubricant is contaminated by water content in an amount as slight as about 100 ppm, the resistance of the bearing material to rolling fatigue shows a drop as large as 32 to 48% (P. Schatsberg, I. M. Felsen, "Effects of water and oxygen during rolling contact lubrication, wear", 12, pp. 331–342, 1968 (hereinafter referred to as "Reference 2"). If the contact rubber seal fitted in the chock (bearing box) outside the bearing and the contact rubber seal incorporated in the bearing are used in combination, the water concentration in the lubricant can be suppressed to less than 10% but the contamination of the lubricant by water content cannot be completely inhibited, making it impossible to avoid the reduction of the resistance of the bearing material to rolling fatigue as pointed out by Reference 2. In other words, 1st Prior Art is disadvantageous in that it cannot completely inhibit the contamination of the lubricant by water content, causing a drop of the resistance of the bearing material to rolling fatigue and hence making it impossible to provide the bearing with a desired durability, i.e., life L.

Further, in accordance with 2nd Prior Art, the contamination of the lubricant by water is inhibited by the predetermination of air pressure in the chock (bearing box) to a high value. Therefore, this effect doesn't depend on the waterproofness of the contact rubber seal as in 1st Prior Art. However, 2nd Prior Art is disadvantageous in that it can hardly perform almost perfect prevention of contamination by water content such as reduction of the water content in the lubricant to not more than 100 ppm.

SUMMARY OF THE INVENTION

The present invention has been worked out in the light of the foregoing prior art problems. An object of the present invention is to provide a roll bearing which exhibits little drop of life even if the lubricant used is externally contaminated by water content.

The above-mentioned object can be attained by a roller bearing, according to a first aspect of the present invention, comprising an inner ring, an outer ring and a roller rotatably interposed between the inner and outer rings, wherein the roller includes a head portion, a rolling surface, and a chamfered portion disposed between the head portion and the rolling surface, and at least one of the inner and outer ring includes a race track surface, a main collar surface contactable with the head portion, and a relief groove disposed between the race track surface and the main collar surface, in which the radius $r_c$ of curvature at a joint between the head portion and the chamfered portion of the roller is not less than 0.2 mm.

In the above-mentioned construction of the roller bearing, it is preferable that the roughness $(\sigma_1^2+\sigma_2^2)^{1/2}$ resulting from a central line average roughness $\sigma_1$ of the head portion of the roller and a central line average roughness $\sigma_2$ of the main collar surface is not more than 0.3 $\mu$mRa.

Further, in the above-mentioned construction of the roller bearing, it is advantageous that the sum of the concentration of sulfur, oxygen and titanium by weight in a steel material constituting one of the inner and outer rings is not more than 100 ppm.

In addition, the above-mentioned object can also be achieved by a roller bearing, according to a second aspect of the present invention, comprising an inner ring, an outer ring and a roller rotatably interposed between the inner and outer rings, wherein the roller includes a head portion, a rolling surface, and a chamfered portion disposed between the head portion and the rolling surface, and at least one of the inner and outer ring includes a race track surface, a main collar surface contactable with the head portion, and a relief groove disposed between the race track surface and the main collar surface, in which the roughness $(\sigma_1^2+v_2^2)^{1/2}$ resulting from a central line average roughness $\sigma_1$ of the head portion of the roller and a central line average roughness $\sigma_2$ of the main collar surface is not more than 0.3 $\mu$mRa.

Further, the above-mentioned object can also be achieved by a roller bearing, according to a third aspect of the present invention, comprising an inner ring, an outer ring and a roller rotatably interposed between the inner and outer rings, wherein the roller includes a head portion, a rolling surface, and a chamfered portion disposed between the head portion and the rolling surface, and at least one of the inner and outer ring includes a race track surface, a main collar surface contactable with the head portion, and a relief groove disposed between the race track surface and the main collar surface, in which the dimension $y_c$ of the chamfered portion of the roller in a direction along the diameter of the roller is not less than the height $y_k$ of a border line defined between the relief groove and the main collar surface from the race track surface.

In the above-mentioned construction of the roller bearing, it is preferable that the dimension $y_c$ of the chamfered portion of the roller in a direction along the diameter of the roller is not less than the height $y_k$ of a border line defined between the relief groove and the main collar surface from the race track surface.

Furthermore, the above-mentioned object can be attained by a roller bearing, according to a fourth aspect of the present invention, comprising an inner ring, an outer ring and a roller rotatably interposed between the inner and outer rings, wherein the roller includes a head portion, a rolling surface, and a chamfered portion disposed between the head portion and the rolling surface, and at least one of the inner and outer ring includes a race track surface, a main collar surface contactable with the head portion, a relief groove disposed between the race track surface and the main collar surface, and a chamfered part connected to the main collar surface and disposed apart from the race track surface, wherein the roller bearing further comprises a cage having a sliding surface which is brought in sliding contact with the rolling surface of the roller, in which the radius $r_k$ of curvature at a joint between the main collar surface and the chamfered part is not less than 0.2 mm, and the roughness $(\sigma_3^2+\sigma_4^2)^{1/2}$ resulting from a central line average roughness $\sigma_3$ of the sliding surface of the cage and a central line average roughness $\sigma_4$ of the rolling surface of the roller is not more than 1 $\mu$mRa.

In the above-mentioned construction of the roller bearing, it is preferable that the sum of the concentration of sulfur, oxygen and titanium by weight in a steel material constituting one of the inner and outer rings is not more than 100 ppm.

The above-mentioned roller bearing according to the first to fourth aspect of the present invention, it is preferable that the roller is one of a cylindrical roller and a tapered roller.

Moreover, the object of the present invention can also be attained by a rolling bearing, according to a fifth aspect of the present invention comprising an inner ring, an outer ring, a rolling element which is rotatably interposed between the inner and outer rings and has a rolling surface, and a cage having a sliding surface which is brought in sliding contact with the rolling surface of the rolling element, in which the roughness $(\sigma_3^2+\sigma_4^2)^{1/2}$ resulting from a central line average roughness $\sigma_3$ of the sliding surface of the cage and a central line average roughness $\sigma_4$ of the rolling surface of the rolling element is not more than 1 $\mu$mRa.

In the above-mentioned construction of the rolling bearing, it is advantageous that the sum of the concentration of sulfur, oxygen and titanium by weight in a steel material constituting one of the inner and outer rings is not more than 100 ppm.

Further, the above-mentioned rolling bearing may be one of a roller bearing and a ball bearing.

On the other hand, the foregoing object of the present invention is accomplished with a roll bearing comprising at least an outer ring, an inner ring and a rolling element for use in an environment liable to contamination of lubricant by water content, characterized in that one or more of the following requirements are satisfied:

(1) The radius $r_c$ of curvature at the joint between the head portion and the chamfered portion of said rolling element shall be not less than 0.2 mm;

(2) The roughness $(\sigma_1^2+\sigma_2^2)^{1/2}$ resulting from the central line average roughness $\sigma_1$ of the head portion of said rolling element and the central line average roughness $\sigma_2$ of the main collar surface of the bearing ring shall be not more than 0.3 $\mu$mRa;

(3) The dimension $y_c$ of the chamfered portion lying between the head portion and the rolling surface of said rolling element in the direction along the diameter of said rolling element shall be not less than the height $y_k$ of the border line in the relief groove on the main collar surface of the bearing ring from the surface of the track;

(4) The radius $r_k$ of curvature at the joint between the main collar surface and the chamfered portion of the bearing ring shall be not less than 0.2 mm;

(5) The roughness $(\sigma_3^2+\sigma_4^2)^{1/2}$ resulting from the central line average roughness $\sigma_3$ of the surface of the cage which comes in sliding contact with the rolling surface of the rolling element and the central line average roughness $\sigma_4$ of the rolling surface of the rolling element shall be not more than 1 $\mu$mRa; and (6) The sum of the concentration of sulfur, oxygen and titanium by weight in the material (steel) constituting the bearing ring shall be not more than 100 ppm.

BRIEF DESCRIPTION OF THE DRAWINGS

FIGS. 1(a)–(c) are diagrams illustrating the radius $r_c$ of curvature of the joint between the head portion and the chamfered portion of the roller wherein

FIGS. 2(a) and (b) are diagrams illustrating the dimension of particular parts of a roller bearing wherein

FIGS. 3(a)–(c) are diagrams illustrating the dimension of particular parts of another roller bearing wherein FIG. 3(a) is a semi-sectional view of an inner ring of a tapered roller bearing, FIG. 3(b) is an enlarged view of a portion b of the inner ring and FIG. (c) is a semi-sectional view of an outer ring of the tapered roller bearing;

FIGS. 4(a) and (b) are diagrams illustrating the area where the rolling surface of a rolling element and a cage come in sliding contact with other;

FIGS. 5(a) and (b) are diagrams illustrating the mechanism of peeling in operation lubricated with a lubricant contaminated by water wherein

DETAILED DESCRIPTION OF THE PREFERRED EMBODIMENTS

Figure 1:
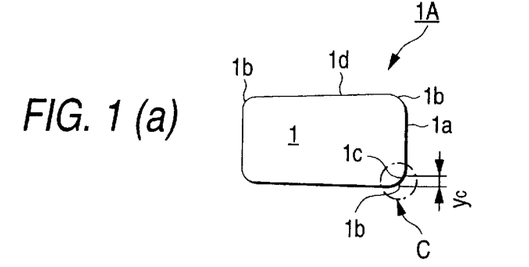
FIG. 1(a) is an enlarged view of a tapered roller.
FIG. 1(b) is an enlarged view of a cylindrical roller.
FIG. 1(c) is an enlarged view of a portion 1b.
Figure 2:
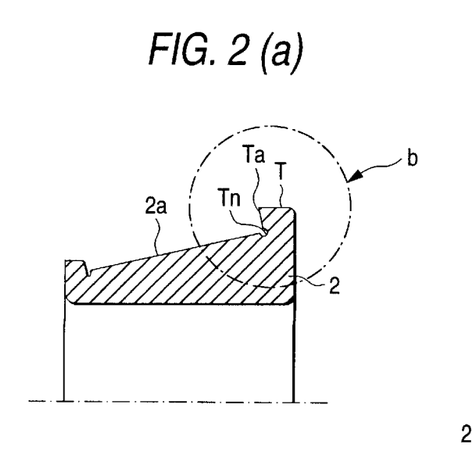
FIG. 2(a) is a semi-sectional view of an inner ring of a tapered roller bearing and FIG. 2(b) is an enlarged view of a portion b of the inner ring.
Figure 3:
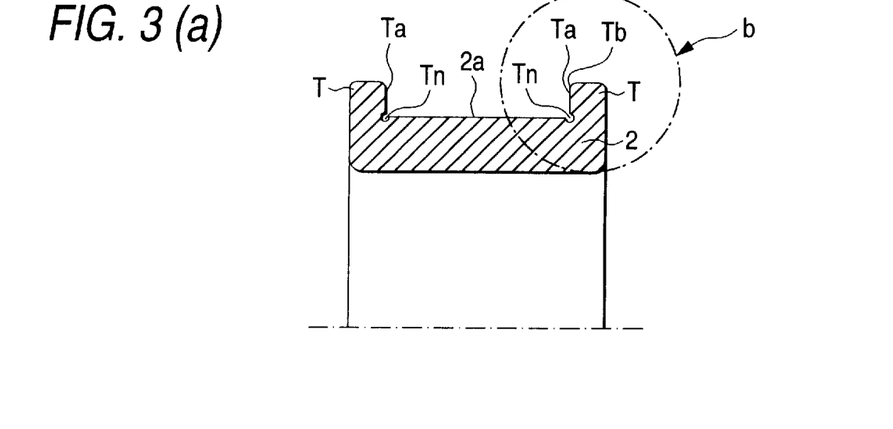

Referring to the foregoing requirements according to the present invention in connection with the attached drawings, the roller bearing can be provided with the following characteristics:

(1) If the radius $r_c$ of curvature of the joint 1c between the head portion 1a and the chamfered portion 1b of a rolling element 1 regardless of whether it is a tapered roller (1A) or a cylindrical roller (1B) is not less than 0.2 mm as shown in FIG. 1, a prolonged bearing life can be provided;

(2) If the roughness $(\sigma_1^2+\sigma_2^2)^{1/2}$ resulting from the central line average roughness $\sigma_1$ of the head portion 1a of the rolling element 1 and the central line average roughness $\sigma_2$ of the main collar surface Ta of the bearing rings 2, 3 having a collar T (inner ring 2 of the tapered roller bearing, outer ring 3 or inner ring 2 of the cylindrical roller bearing) is not more than 0.3 $\mu$mRa as shown in FIGS. 1 and 2, a prolonged life can be provided;

(3) If the dimension $y_c$ of the chamfered portion 1b lying between the head portion 1a and the rolling surface 1d of the rolling element 1 in the direction along the diameter of the rolling element is not less than the height $y_k$ of the border line in the relief groove Tn on the main collar surface Ta of the bearing rings 2, 3 from the surface of the tracks 2a, 3a as shown in FIGS. 1 to 3, a prolonged life can be provided; and (4) If the radius $r_k$ of curvature at the joint between the main collar surface Ta and the chamfered portion Tb of the bearing rings 2, 3 is not less than 0.2 mm, a prolonged life can be provided.

Figure 4:
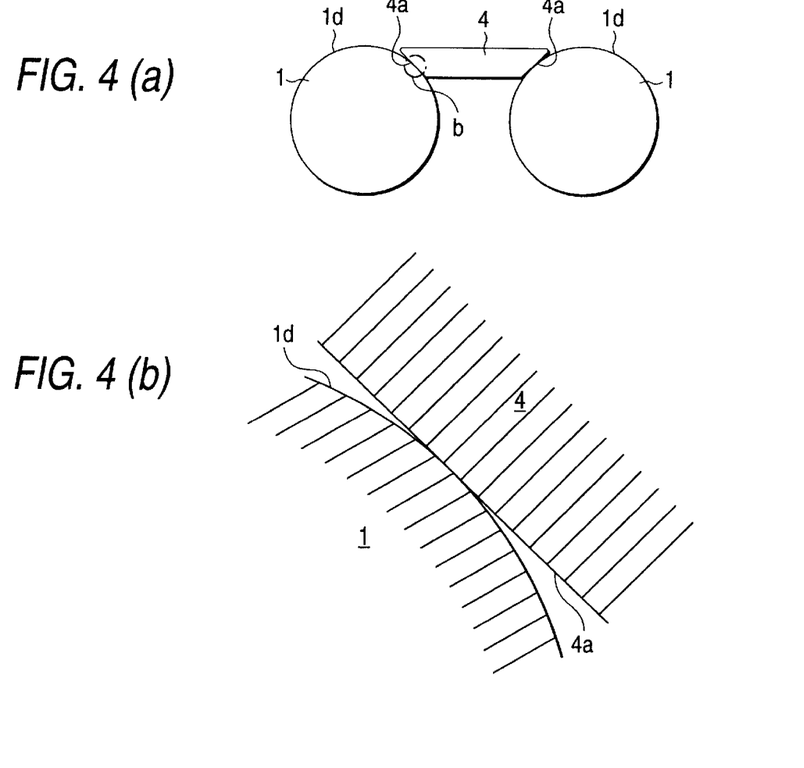

Further, roll bearings, including roller bearing and ball bearing, can be provided with the following characteristics:

(5) If the roughness $(\sigma_3^2+\sigma_4^2)^{1/2}$ resulting from the central line average roughness $\sigma_3$ of the surface 4a of the cage 4 which comes in sliding contact with the rolling surface 1d of the rolling element 1 and the central line average roughness $\sigma_4$ of the rolling surface 1d of the rolling element 1 is not more than 1 $\mu$mRa, a prolonged life can be provided; and (6) If the sum of the concentration of sulfur, oxygen and titanium by weight in the material (steel) constituting the bearing ring 3 is not more than 100 ppm, a prolonged life can be provided.

The roll bearing of the present invention satisfies one or more of the foregoing requirements.

<Embodiments of the Invention>

Embodiments according to the present invention will be described hereinafter in connection with the accompanying drawings.

The inventors made extensive studies of roll bearing which can operate over a prolonged life even if lubricated with a lubricant contaminated by water content. As a result, a knowledge was obtained that the reduction of slippage on the surface of the rolling element which comes in rolling contact with the bearing ring is the most effective for this purpose.

A roll bearing in operation is less liable to slippage on its rolling contact area as the damping force for stopping the rotation of the rolling element becomes smaller. The damping force is mainly composed of frictional force acting on the area of the head portion of the roller which comes in sliding contact with the collar and frictional force acting on the rolling surface of the roller or ball which comes in sliding contact with the cage. When the roll bearing is fairly lubricated in operation, i.e., an oil film is sufficiently formed, these frictional forces are very small and thus can be neglected as such. However, when an oil film is not sufficiently formed due to contamination of the lubricant by water or other causes, these frictional forces cannot be neglected as frictional force against the rotation of the rolling element and thus can cause slippage on the rolling contact area.

Figure 5:
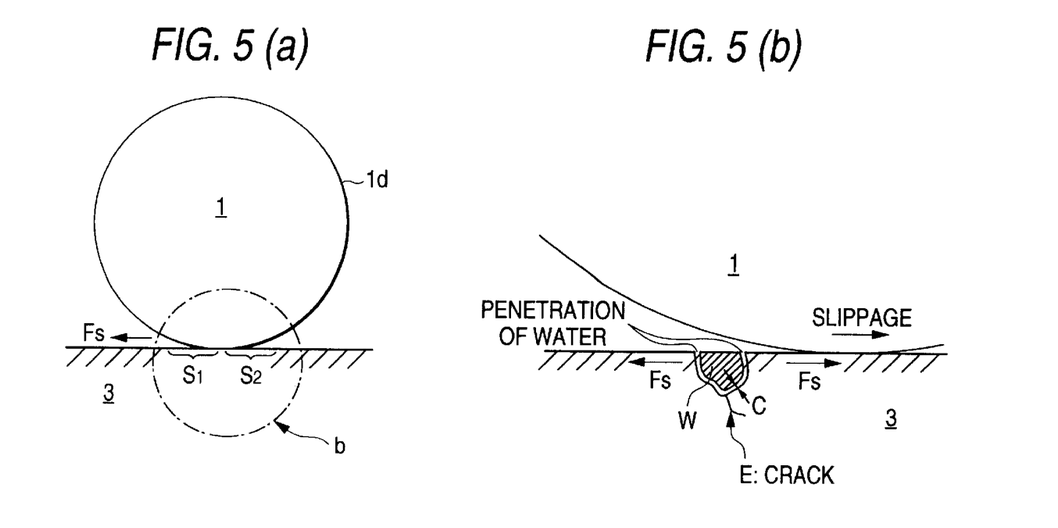
FIG. 5(a) is a sectional view of the area where a rolling element and a bearing ring come in contact with each other and FIG. 5(b) is an enlarged view of a portion b of the contact area.

On the other hand, slippage on the rolling contact area is predominated by abrasion, which causes no peeling, if the lubricant used is almost free of water content. Further, if an oil film is not sufficiently formed, slippage can lead to seizing. However, if the lubricant used is contaminated by water content in an amount of not less than 100 ppm, the resulting hydrogen embrittles steel at the rolling contact area, causing peeling with surface nonmetallic inclusions as starting points rather than abrasion. This is because slippage on the rolling contact surface gives tensile stress to the rolling surface in its vicinity, causing cracking with cutouts in the hydrogen-embrittled tensile stress site, i.e., nonmetallic inclusions, as starting points. A typical example of this mechanism is shown in FIG. 5.

When slippage occurs on the rolling element 1, tensile stress $F_s$ acts on the site opposite the direction of slippage on the rolling surface in the vicinity of the rolling contact area on the bearing ring 3. When tensile stress $F_s$ repeatedly acts, the adhesivity between nonmetallic inclusions W in the bearing ring and the substrate of the bearing ring decreases, water enters in the gap C between the nonmetallic inclusions W and the substrate by capillary action in time. Then, corrosion reaction occurs in the gap C as follows:

$$Fe+2OH^- \rightarrow Fe(OH)_2+2e^-$$

$$2H_2O+2e^- \rightarrow 2OH^-+2H \text{ (penetrates in steel)}$$

The hydrogen atom H thus produced penetrates in and embrittles the steel. Once the steel is embrittled, repeated tensile stress causes the generation of crack E at a point in the gap C, resulting in peeling. The rolling element, which rotates at the highest among the members constituting the roll bearing, i.e., outer ring, the inner ring and the rolling element, can hardly allow water to reside in the gap C due to its centrifugal force, rarely causing peeling. Peeling occurs mostly on the bearing ring, i.e., outer ring and inner ring. In the bearing ring, peeling occurs more on the fixed bearing ring.

In order to prolong the bearing life L against the foregoing mechanism, it is effective to reduce either or both of the damping force (frictional force) acting on the rolling element and the amount of nonmetallic inclusions in the bearing ring. For example, in order to reduce the frictional force of the head portion (1a) of the roller with the main collar surface (Ta) of the bearing ring, it is effective to minimize the occurrence of edge on the sliding contact area and reduce the surface roughness of the sliding contact area.

Figure 6:
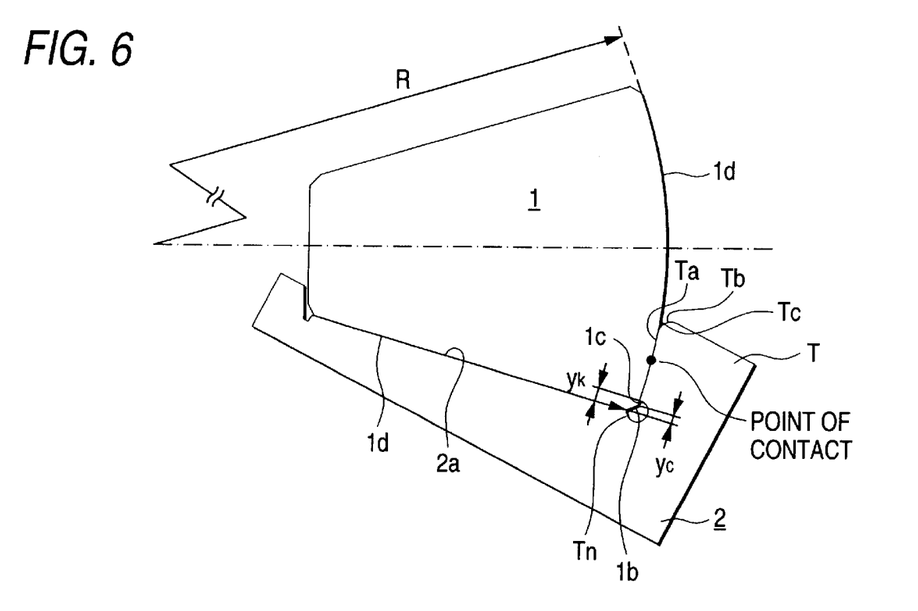
FIG. 6 is a diagram illustrating how the head portion of a roller and the main collar surface of a bearing ring come in point contact with each other.

As shown in FIG. 6, the head portion 1a of the roller comes in contact with the main collar surface Ta mostly at a point on the main collar surface Ta when these members are brand-new. This is because the head portion 1a of the roller has been worked to have a curvature having a great radius R, though being seemingly planar. However, when the roll bearing operates lubricated with a lubricant contaminated with water content, the head portion 1a of the roller and the main collar surface Ta are worn away and come in contact with each other at a wider surface thereof. In order to prevent the rise in the foregoing frictional force under these circumstances, it is effective to arrange such that the border (edge) of the main collar surface Ta with the relief groove Tn is not contained in the contact area. To this end, it is necessary that the dimension $y_c$ of the chamfered portion 1b lying between the head portion 1a and the rolling surface 1d of the roller in the direction along the diameter of the roller (see FIG. 1) be not less than the height $y_k$ of the border line in the relief groove Tn on the main collar surface Ta of the bearing ring from the surface of the track 2a (see FIGS. 2 and 3).

Further, the joint Tc between the main collar surface Ta and the chamfered portion Tb of the bearing ring may lie in the contact area when the head portion 1a of the roller is worn away. In order to reduce the edge effect or the concentration of stress under these circumstances, it is necessary that the joint Tc be rounded. The inventors found that when the joint Tc has a curvature having a radius $r_k$ (see FIGS. 2 and 3) of not less than 0.2 mm, the effect of prolonging the bearing life is saturated.

When the lubricant used is contaminated by water content, the head portion 1a of the roller and the main collar surface Ta of the bearing ring undergo abrasion as mentioned above. This means that the head portion 1a of the roller and the main collar surface Ta show a great frictional force. As the frictional force increases, the roller shows a drop of the straightness in advance in the direction of rolling (the posture of the roller becomes unstable) and hence undergoes a slight zigzag movement or skewing. Once skewing occurs, the surface of the head portion 1a of the roller which comes in contact with the main collar surface Ta contains the joint 1c between the head portion 1a of the roller and the chamfered portion 1b. In order to reduce the frictional force at this position, it is necessary that the joint 1c be thoroughly rounded. The inventors found that when the joint 1c has a curvature having a radius $r_c$ (see FIG. 1) of not less than 0.2 mm, the effect of prolonging the bearing life is saturated.

Further, the smaller the surface roughness of the roller head portion 1a and the main collar surface Ta of the bearing ring are, the smaller is the frictional force of the roller head portion 1a with the main collar surface Ta. The inventors found that when the roughness $(\sigma_1^2+\sigma_2^2)^{1/2}$ resulting from the central line average roughness $\sigma_1$ of the roller head portion 1a and the central line average roughness $\sigma_2$ of the main collar surface Ta of the bearing ring is not more than 0.3 $\mu$mRa, the effect of prolonging the bearing life is saturated.

Moreover, in order to reduce the frictional force of the rolling element with the cage, it is effective to reduce the roughness of the rolling surface of the rolling element and the surface of the cage which comes in sliding contact therewith ($\sigma_3$ and $\sigma_4$, respectively, in terms of central line average roughness) The inventors experimentally found that when the roughness $(\sigma_3^2+\sigma_4^2)^{1/2}$ resulting from the two surface roughnesses is not more than 1 $\mu$mRa, the effect of prolonging the bearing life is saturated.

Further, as previously mentioned, the reduction of the amount of nonmetallic inclusions which cause the occurrence of cutouts on the surface of the bearing ring is effective to prolong the bearing life. The inventors experimentally studied the relationship between the total concentration of elements constituting nonmetallic inclusions, i.e., S, O and Ti and the bearing life L and then found that when the total concentration is not more than 100 ppm, the effect of prolonging the bearing life is saturated.

EXAMPLE (A) Bearing to be tested:

As a material constituting the outer ring, inner ring and rolling element there was used a high carbon steel (SUJ2). As a material constituting the cage there was used a low carbon steel (SPCC). A tapered roller bearing having the following basic specification was prepared from these materials. The tapered roller bearing thus prepared was then subjected to life test in operation lubricated with a lubricant contaminated by water.

Basic specification of bearing

Calling No.: HR32017XJ

Outer diameter D of outer ring: 130 mm

Inner diameter d of inner ring: 85 mm

Width of assembly: 29 mm

Basic dynamic rated load C: 143,000 N

For the heat treatment of the outer ring, inner ring and roller, hardening and tempering were conducted. The inner ring and outer ring exhibit a hardness HRC of 62.1 and a residual austenite content of 10 vol %. The roller exhibits a hardness HRC of 62.8 and a residual austenite content of 12 vol %. The track on the outer ring and inner ring has a surface roughness of 0.10 μmRa.

Bearings having a variety of dimensions and surface roughnesses of particular members were prepared on the basis of the foregoing basic specification. These bearings were then subjected to life test in operation lubricated with a lubricant contaminated by water. Thus, these bearings were compared in life time.

These bearings are called by designation HR32017XJ-No. (No. indicates an integer of from 1 to 50). The specification of these bearings are set forth in Tables 1 and 2.

TABLE 1

|  | Calling No. of bearing | $y_c - y_k$ (mm) | $r_c$ (mm) | $r_k$ (mm) | $(\sigma_1^2 + \sigma_2^2)^{1/2}$ (μm Ra) | $(\sigma_3^2 + \sigma_4^2)^{1/2}$ (μm Ra) | S + O + Ti (ppm) |
|---|---|---|---|---|---|---|---|
| Comparative | HR32017XJ-1 | −0.40 | 0.10 | 0.10 | 0.48 | 5.0 | 173 |
| Comparative | 2 | ↑ | 0.15 | ↑ | ↑ | ↑ | ↑ |
|  | 3 | ↑ | 0.20 | ↑ | ↑ | ↑ | ↑ |
|  | 4 | ↑ | 0.25 | ↑ | ↑ | ↑ | ↑ |
|  | 5 | ↑ | 0.30 | ↑ | ↑ | ↑ | ↑ |
|  | 6 | ↑ | 0.50 | ↑ | ↑ | ↑ | ↑ |
| Comparative | 7 | ↑ | 0.10 | ↑ | 0.40 | ↑ | ↑ |
| Comparative | 8 | ↑ | ↑ | ↑ | 0.35 | ↑ | ↑ |
|  | 9 | ↑ | ↑ | ↑ | 0.30 | ↑ | ↑ |
|  | 10 | ↑ | ↑ | ↑ | 0.28 | ↑ | ↑ |
|  | 11 | ↑ | ↑ | ↑ | 0.26 | ↑ | ↑ |
|  | 12 | ↑ | ↑ | ↑ | 0.25 | ↑ | ↑ |
| Comparative | 13 | −0.20 | ↑ | ↑ | 0.48 | ↑ | ↑ |
| Comparative | 14 | −0.10 | ↑ | ↑ | ↑ | ↑ | ↑ |
|  | 15 | 0 | ↑ | ↑ | ↑ | ↑ | ↑ |
|  | 16 | +0.10 | ↑ | ↑ | ↑ | ↑ | ↑ |
|  | 17 | +0.20 | ↑ | ↑ | ↑ | ↑ | ↑ |
|  | 18 | +0.40 | ↑ | ↑ | ↑ | ↑ | ↑ |
| Comparative | 19 | −0.40 | ↑ | 0.15 | ↑ | ↑ | ↑ |
|  | 20 | ↑ | ↑ | 0.20 | ↑ | ↑ | ↑ |
|  | 21 | ↑ | ↑ | 0.25 | ↑ | ↑ | ↑ |
|  | 22 | ↑ | ↑ | 0.30 | ↑ | ↑ | ↑ |
|  | 23 | ↑ | ↑ | 0.50 | ↑ | ↑ | ↑ |
| Comparative | 24 | ↑ | ↑ | 0.10 | ↑ | 3.0 | ↑ |
| Comparative | 25 | ↑ | ↑ | ↑ | ↑ | 2.0 | ↑ |
| Comparative | 26 | ↑ | ↑ | ↑ | ↑ | 1.5 | ↑ |

TABLE 2

|  | Calling No. of bearing | $y_c - y_k$ (mm) | $r_c$ (mm) | $r_k$ (mm) | $(\sigma_1^2 + \sigma_2^2)^{1/2}$ (μm Ra) | $(\sigma_3^2 + \sigma_4^2)^{1/2}$ (μm Ra) | S + O + Ti (ppm) |
|---|---|---|---|---|---|---|---|
|  | HR32017XJ-27 | −0.40 | 0.10 | 0.10 | 0.48 | 1.0 | 173 |
|  | 28 | ↑ | ↑ | ↑ | ↑ | 0.65 | ↑ |
|  | 29 | ↑ | ↑ | ↑ | ↑ | 0.50 | ↑ |
|  | 30 | ↑ | ↑ | ↑ | ↑ | 0.41 | ↑ |
| Comparative | 31 | ↑ | ↑ | ↑ | ↑ | 5.0 | 141 |
| Comparative | 32 | ↑ | ↑ | ↑ | ↑ | ↑ | 120 |
| Comparative | 33 | ↑ | ↑ | ↑ | ↑ | ↑ | 109 |
|  | 34 | ↑ | ↑ | ↑ | ↑ | ↑ | 100 |
|  | 35 | ↑ | ↑ | ↑ | ↑ | ↑ | 80 |
|  | 36 | ↑ | ↑ | ↑ | ↑ | ↑ | 65 |
|  | 37 | ↑ | ↑ | ↑ | ↑ | ↑ | 42 |
|  | 38 | ↑ | ↑ | ↑ | ↑ | ↑ | 28 |
|  | 39 | ↑ | 0.20 | ↑ | 0.30 | ↑ | 173 |
|  | 40 | 0 | ↑ | ↑ | ↑ | ↑ | ↑ |
|  | 41 | +0.10 | ↑ | 0.20 | ↑ | ↑ | ↑ |
|  | 42 | +0.20 | ↑ | ↑ | ↑ | 1.0 | ↑ |
|  | 43 | +0.40 | ↑ | ↑ | ↑ | ↑ | 100 |
|  | 44 | 0 | ↑ | 0.10 | ↑ | ↑ | 173 |
|  | 45 | ↑ | ↑ | ↑ | 0.48 | 5.0 | ↑ |
|  | 46 | ↑ | ↑ | 0.20 | ↑ | ↑ | ↑ |
|  | 47 | ↑ | 0.10 | 0.10 | ↑ | 1.0 | ↑ |
|  | 48 | ↑ | 0.20 | 0.20 | 0.30 | 5.0 | 100 |
|  | 49 | ↑ | ↑ | ↑ | 0.48 | ↑ | ↑ |
|  | 50 | ↑ | ↑ | 0.10 | ↑ | ↑ | ↑ |

In these tables, HR32017XJ-1, -2, -7, -8, -13, -14, -19, -24, -25, -31, -32 and -33 are comparative bearings while the others are bearings according to the present invention.

The bearings set forth in these tables exhibit $y_k$ value of 1.0 mm. The point of the roller head portion 1 which comes in contact with the main collar surface Ta lies at a height of 1.8 mm from the track (see FIG. 6) and almost at the central part of the main collar surface Ta before test.

(B) Durability test:

Testing machine

Figure 7:
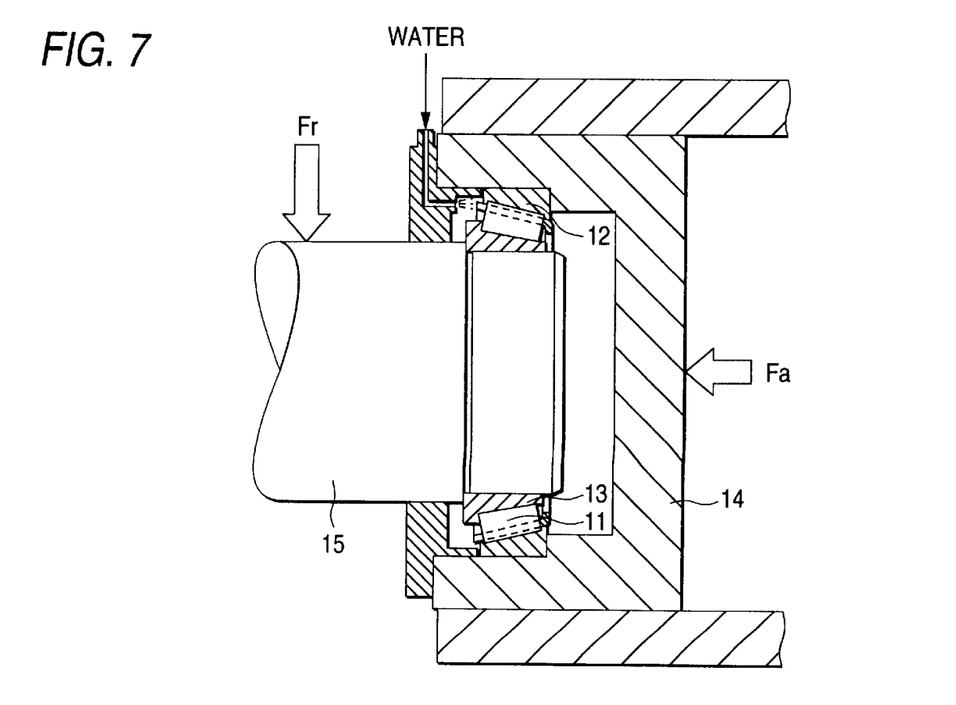
FIG. 7 is a sectional view of an essential part of a roll bearing durability testing machine.
Figure 9:
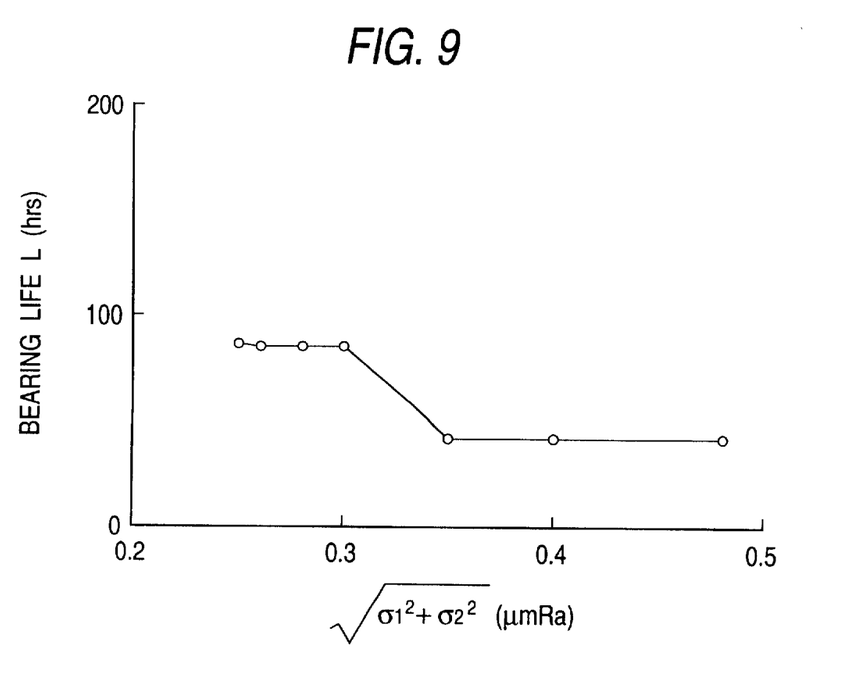
FIG. 9 is a graph illustrating the relationship between the roughness $(\sigma_1^2+\sigma_2^2)^{1/2}$ resulting from the central line average roughness $\sigma_1$ of the head portion of a roller and the central line average roughness $\sigma_2$ of the main collar surface of a bearing ring and the bearing life L.

FIG. 7 is a sectional view of an essential part of the durability testing machine used. For the durability test, an outer ring 12 was incorporated in a housing 14. An inner ring 13 was fitted in a rotary shaft 15. The rotary shaft 15 was rotated under the application of an axial load Fa and a radial load Fr while water was being injected into the interior of the bearing at a rate of 10 cc per hour as shown in FIG. 9. The outer ring 12 and the housing 14 were combined by clearance fit. The housing 14 was formed such that its inner diameter is from 10 to 15 μm greater than the outer diameter D of the outer ring 12. Further, the inner ring 13 and the rotary shaft 15 were combined by clearance fit. The inner ring 13 was formed such that its inner diameter d is from 8 to 15 μm greater than the diameter of the rotary shaft 15.

Conditions of durability test

Radial load Fr: 71,500 N

Axial load Fa: 15,680 N

Rotary speed n of rotary shaft: 2,500 rpm

Kind of lubricant: Grease (see Table 3)

Amount of grease: 60 g

Rate of supply of water into the interior of bearing: 10 cc/hr

Table 3 shows the specification of the grease used as a lubricant in the durability test. In other words, the grease was prepared by adding 12% of a lithium soap as a thickening agent to a mineral oil having a dynamic viscosity of 197 mm²/sec at 40° C. as a base oil.

TABLE 3

| Thickening agent | Lithium soap |
|---|---|
| Amount of thickening agent (wt-%) | 12 |
| Base oil | Mineral oil |
| Dynamic viscosity of base oil (mm²/sec, 40° C.) | 197 |
| Mixed viscosity (NLG1 grade) | No. 1 |
| pH | 7.0 |
| Water concentration in grease before test (wt-%) | 0.10 |

The pH value of the grease was measured as follows. In some detail, a solvent was prepared by mixing toluene, 2-propanol and water at a volume ratio of 500:495:5. At a temperature of 25° C., 0.1 g of the foregoing grease was dissolved in 50 mg of the solvent thus prepared. The solution was then measured for hydrogen ion index pH by means of a pH meter. Thus, a grease having a hydrogen ion index pH of 7.0 was obtained.

The durability test was conducted on 10 samples each for examples and comparative examples. The operating time of the sample which first shows peeling was determined as bearing Life L. This bearing life L was then compared with the rated bearing life $L_{10}$ to evaluate the service life of the bearing. In this test, peeling occurred all on the outer ring as a fixed bearing ring.

The rated life $L_{10}$ of bearing is defined by calculated time corresponding to the total number of revolutions which can be performed by 90% of bearings of the same lot having the same size under the same conditions without undergoing peeling due to rolling fatigue. It is known that the rated life $L_{10}$ of a tapered roller bearing can be calculated by the equation (1) from the basic dynamic rated load C (N), the radial load Fr (N) and the rotary speed n (rpm) of the rotary shaft 15:

$$L_{10} = (C/Fr)^{10/3} \times 10^6/(60n) \quad (1)$$

It is considered that a bearing prepared by the use of a modern technique on raw steel and working never undergoes peeling within an operating time of not longer than the rated life $L_{10}$ when a sufficient oil film is formed on the rolling surface of the rolling element and the track of the bearing ring. In the case of the present example, since the basic rated load C is 143,000 N, the radial load Fr is 71,500 N and the rotary speed n of the rotary shaft is 2,500 rpm, the rated life $L_{10}$ of the bearing can be calculated to be 67 hours by the equation (1). In this respect, 10 samples of the tapered roller bearing HR32017XJ-1 set forth in Table 1 were subjected to life test under the same conditions as mentioned above except that water was not injected into the interior of the bearing. As a result, the bearing showed a bearing life L of 6,705 hours, about 100 times the rated life $L_{10}$.

Results of life test

The results of the life test will be considered as follows.

Figure 8:
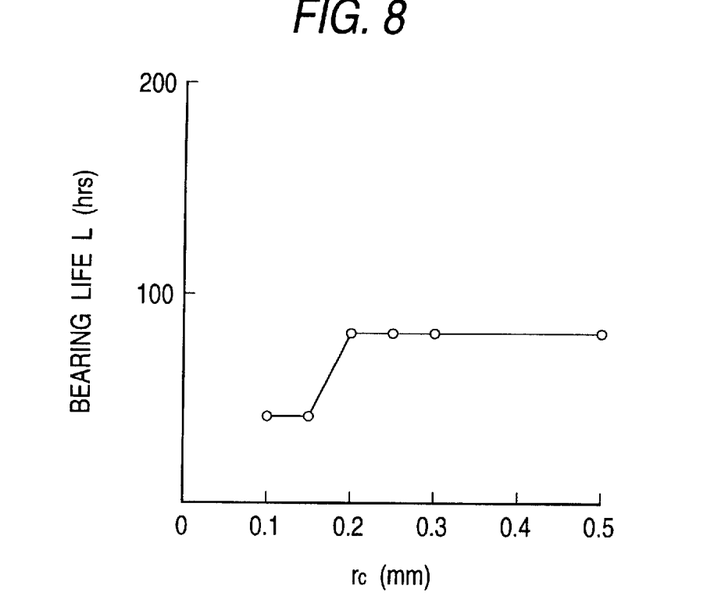
FIG. 8 is a graph illustrating the relationship between the radius $r_c$ of curvature of a joint and the bearing life L.

FIG. 8 shows the relationship between $r_c$ (radius of curvature of the joint between the head portion and the chamfered portion of the rolling element) and bearing life L obtained from the results of life test on the bearings HR32017XJ-1 to 6. When $r_c$ is not less than 0.2 mm, the life of the bearings is about twice that of the bearings having $r_c$ of not more than 0.15 mm.

FIG. 9 shows the relationship between the roughness $(\sigma_1^2 + \sigma_2^2)^{1/2}$ resulting from the central line average roughness $\sigma_1$ of the head portion of the rolling element and the central line average roughness $\sigma_2$ of the main collar surface Ta of the bearing ring and the bearing life L obtained from the results of life test on bearings HR32017XJ-1 and HR32017XJ-7 to 12. When the roughness $(\sigma_1^2 + \sigma_2^2)^{1/2}$ is not more than 0.3 μmRa, the bearing life L is about twice that of bearings having a roughness $(\sigma_1^2 + \sigma_2^2)^{1/2}$ of not less than 0.35 μmRa.

Figure 10:
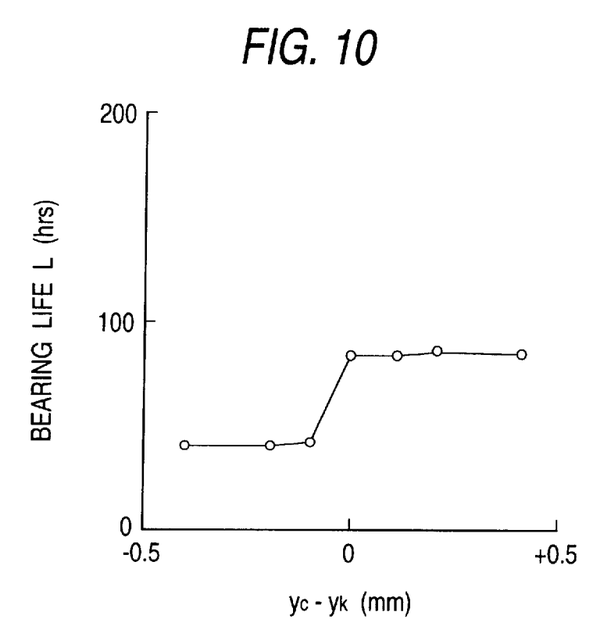
FIG. 10 is a graph illustrating the relationship between $y_c$-$y_k$ and the bearing life L.

FIG. 10 shows the relationship between the difference $(y_c - y_k)$ between the dimension $y_c$ of the chamfered portion between the head portion and the rolling surface of the rolling element in the direction of diameter of the rolling element and the height $y_k$ of the border line in the relief groove on the main collar surface of the bearing ring from the surface of the track and the bearing life L obtained from the results of life test on the bearings HR32017XJ-1 and HR32017XJ-13 to 18. When the difference $(y_c - y_k)$ is not less than 0 mm, the bearing life L is about twice that of bearings having $(y_c - y_k)$ of not more than −0.1 mm.

Figure 11:
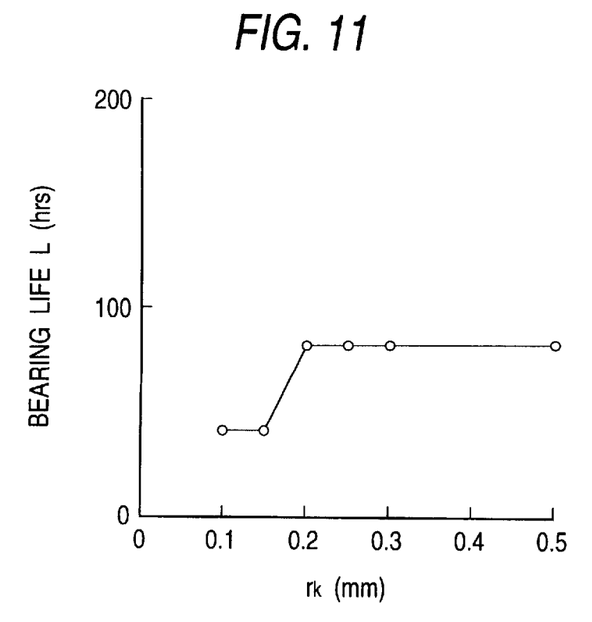
FIG. 11 is a graph illustrating the relationship between $r_k$ and the bearing life L.

FIG. 11 shows the relationship between the radius $r_k$ of curvature of the joint between the main collar surface of the bearing ring and the chamfered portion outside the main collar surface and the bearing life L obtained from the results of life test on the bearings HR32017XJ-1 and HR32017XJ-19 to 23. When $r_k$ is not less than 0.2 mm, the bearing life L is about twice that of bearings having $r_k$ of not more than 0.15 mm.

Figure 12:
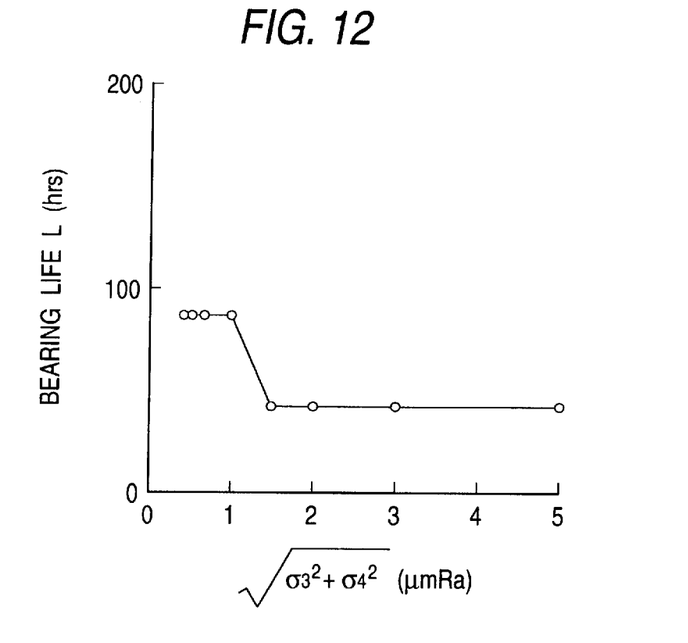
FIG. 12 is a graph illustrating the relationship between the roughness $(\sigma_3^2+\sigma_4^2)^{1/2}$ resulting from the central line average roughness $\sigma_3$ of the surface of a cage which comes in sliding contact with the rolling surface of a rolling element and the central line average roughness $\sigma_4$ of the rolling surface of the rolling element and the bearing life L.

FIG. 12 shows the relationship between the roughness $(\sigma_3^2 + \sigma_4^2)^{1/2}$ resulting from the central line average roughness $\sigma_3$ of the surface of the cage which comes in sliding contact with the rolling surface of the rolling element and the central line average roughness $\sigma_4$ of the rolling surface of the rolling element and the bearing life L obtained from the results of life test on the bearings HR32017XJ-1 and HR32017XJ-24 to 30. When the roughness $(\sigma_3^2 + \sigma_4^2)^{1/2}$ is not more than 1.0 μmRa, the bearing life L is about twice that of bearings having a roughness $(\sigma_3^2 + \sigma_4^2)^{1/2}$ of not less than 1.5 μmRa.

Figure 13:
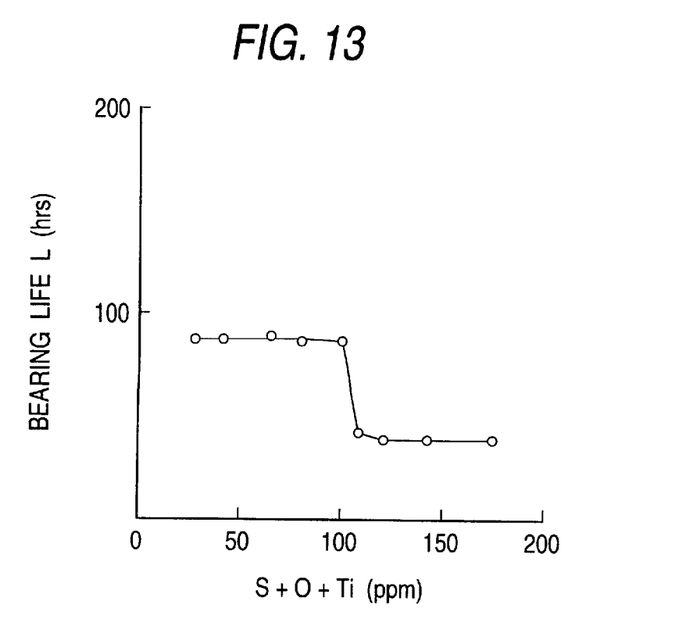
FIG. 13 is a graph illustrating the relationship between the sum of the concentration of S, O and Ti in a bearing ring material (steel) and the bearing life L.

FIG. 13 shows the relationship between the sum (S+O+Ti) ppm of the weight concentration of sulfur, oxygen and titanium in the material of outer ring and the bearing life L obtained from the results of life test on the bearings HR32017XJ-1 and HR32017XJ-31 to 38. When (S+O+Ti) concentration is not more than 100 ppm, the bearing life L is about twice that of bearings having (S+O+Ti) concentration of not less than 109 ppm.

It can be seen in the foregoing results that when the various factors affecting the bearing life L fall within the range defined herein, the bearing life L is about twice that of bearings having various factors falling outside the range defined herein.

The present invention has been described so far faith reference to the relationship between one of the various factors and the bearing life L. For the life L of bearings having two or more factors falling within the range defined herein, the results of life test on the bearings HR32017XJ-1 and HR32017XJ-39 to 50 are set forth in Table 4 and FIG. 14.

TABLE 4

|  | Calling No. of bearing | Number of factors falling within the range defined herein | Bearing life L (hr) |
| --- | --- | --- | --- |
| Comparative | HR32017XJ-1 | 0 | 40 |
|  | 39 | 2 | 161 |
|  | 40 | 3 | 323 |
|  | 41 | 4 | 650 |
|  | 42 | 5 | 1,308 |
|  | 43 | 6 | 2,618 |
|  | 44 | 4 | 637 |
|  | 45 | 2 | 167 |
|  | 46 | 3 | 319 |
|  | 47 | 2 | 165 |
|  | 48 | 5 | 1,288 |
|  | 49 | 4 | 641 |
|  | 50 | 3 | 321 |

Figure 14:
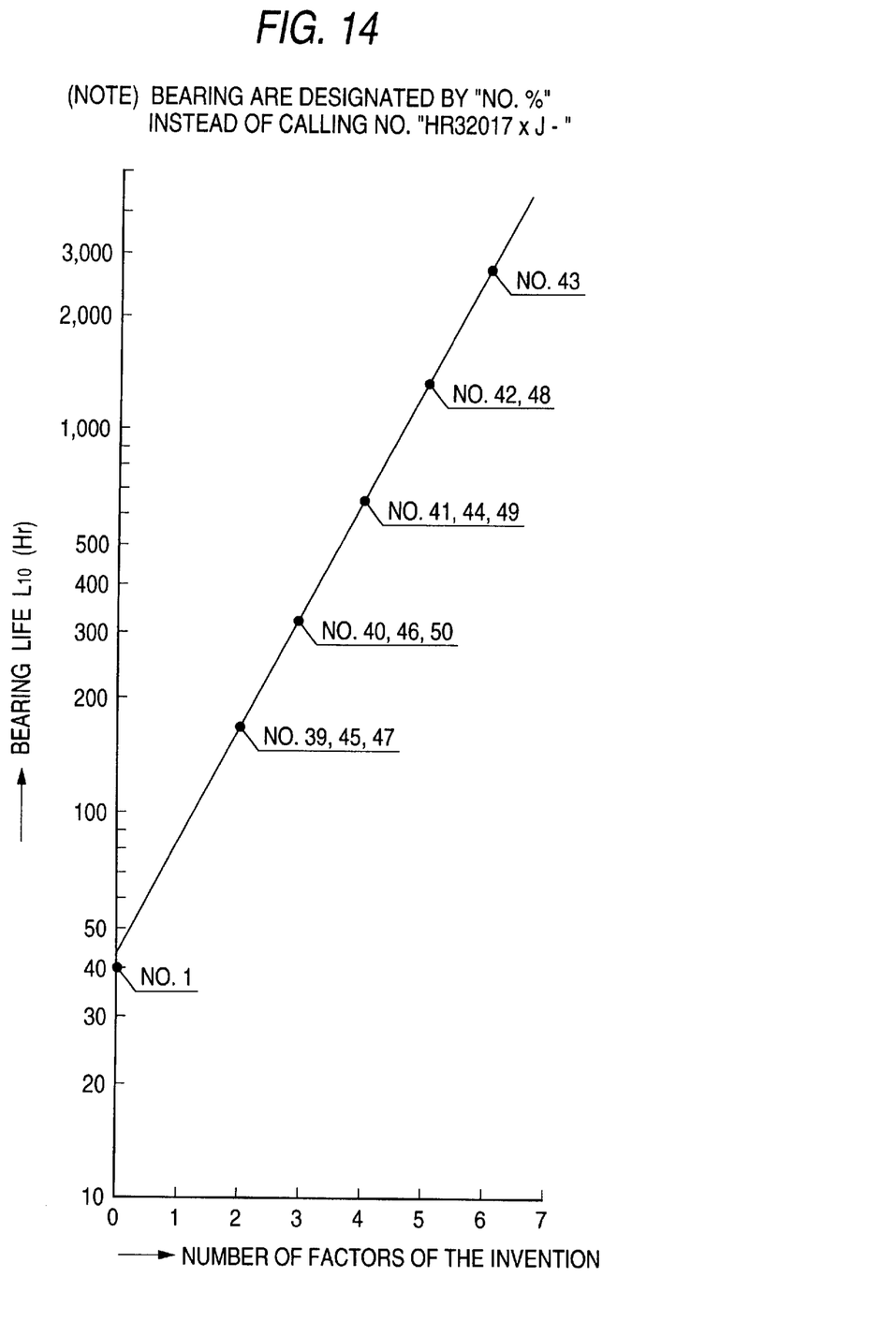
FIG. 14 is a graph illustrating the relationship between the combination of a plurality of factors and the bearing life L.

It can be seen in the results of Table 4 and FIG. 14 that the combination of a plurality of factors makes it possible to further prolong the bearing life L.

As mentioned above, the present invention provides a roll bearing which exhibits little drop of life even in operation lubricated with a lubricant contaminated externally by water content as can be seen in the results of experimental examination of the effect of factors affecting bearing life on the prolongation of bearing life. Thus, the roll bearing according to the present invention exerts a practically great effect.

The present invention is based on Japanese Patent Application No. Hei. 10-42453, which is incorporated herein by reference.

While there has been described in connection with the preferred embodiment of the invention, it will be obvious to those skilled in the art that various changes and modifications may be made therein without departing from the invention, and it is aimed, -therefore, to cover in the appended claim all such changes and modifications as fall within the true spirit and scope of the invention.

What is claimed is:

1. A roller bearing comprising an inner ring, an outer ring and a roller rotatably interposed between said inner and outer rings, wherein said roller (1) includes a head portion (1a), a rolling surface (1d), and a chamfered portion (1b) disposed between said head portion and said rolling surface, and at least one of said inner and outer ring includes a race track surface (2a, 3a), a main collar surface (Ta) contactable with said head portion, and a relief groove (Tn) disposed between said race track surface and said main collar surface, in which the radius $r_c$ of curvature at a joint between said head portion (1a) and said chamfered portion (1b) of said roller is not less than 0.2 mm.

2. The roller bearing according to claim 1, in which the roughness $(\sigma_1^2+\sigma_2^2)^{1/2}$ resulting from a central line average roughness $\sigma_1$ of said head portion (1a) of said roller and a central line average roughness $\sigma_2$ of said main collar surface is not more than 0.3 µmRa.

3. The roller bearing according to claim 2, in which the dimension $y_c$ of said chamfered portion of said roller in a direction along the diameter of said roller is not less than the height $y_k$ of a border line defined between said relief groove (Tn) and said main collar surface (Ta) from said race track surface.

4. The roller bearing according to claim 3, wherein said roller is one of a cylindrical roller and a tapered roller.

5. The roller bearing according to claim 2, wherein said roller is one of a cylindrical roller and a tapered roller.

6. The roller bearing according to claim 1, in which the sum of the concentration of sulfur, oxygen and titanium by weight in a steel material constituting one of said inner and outer rings is not more than 100 ppm.

7. The roller bearing according to claim 6, wherein said roller is one of a cylindrical roller and a tapered roller.

8. The roller bearing according to claim 1, wherein said roller is one of a cylindrical roller and a tapered roller.

9. A roller bearing comprising an inner ring, an outer ring and a roller rotatably interposed between said inner and outer rings, wherein said roller (1) includes a head portion (1a), a rolling surface (1d), and a chamfered portion (1b) disposed between said head portion and said rolling surface, and at least one of said inner and outer ring includes a race track surface (2a, 3a), a main collar surface (Ta) contactable with said head portion, and a relief groove (Tn) disposed between said race track surface and said main collar surface, in which the roughness $(\sigma_1^2+\sigma_2^2)^{1/2}$ resulting from a central line average roughness $\sigma_1$ of said head portion (1a) of said roller and a central line average roughness $\sigma_2$ of said main collar surface is not more than 0.3 µmRa.

10. The roller bearing according to claim 9, wherein said roller is one of a cylindrical roller and a tapered roller.

11. A roller bearing comprising an inner ring, an outer ring and a roller rotatably interposed between said inner and outer rings, wherein said roller (1) includes a head portion (1a), a rolling surface (1d), and a chamfered portion (1b) disposed between said head portion and said rolling surface, and at least one of said inner and outer ring includes a race track surface (2a), a main collar surface (Ta) contactable with said head portion, and a relief groove (Tn) disposed between said race track surface and said main collar surface, in which the dimension $y_c$ of said chamfered portion of said roller in a direction along the diameter of said roller is not less than the height $y_k$ of a border line defined between said relief groove (Tn) and said main collar surface (Ta) from said race track surface.

12. The roller bearing according to claim 11, wherein said roller is one of a cylindrical roller and a tapered roller.

13. A roller bearing comprising an inner ring, an outer ring and a roller rotatably interposed between said inner and outer rings, wherein said roller (1) includes a head portion (1a), a rolling surface (1d), and a chamfered portion (1b) disposed between said head portion and said rolling surface, and at least one of said inner and outer ring includes a race track surface (2a), a main collar surface (Ta) contactable with said head portion, a relief groove (Tn) disposed between said race track surface and said main collar surface, and a chamfered part (Tb) connected to said main collar surface and disposed apart from said race track surface (2a), wherein said roller bearing further comprises a cage (4) having a sliding surface (4a) which is brought in sliding contact with said rolling surface (1d) of said roller, in which the radius $r_k$ of curvature at a joint between said main collar surface and said chamfered part is not less than 0.2 mm, and the roughness $(\sigma_3^2+\sigma_4^2)^{1/2}$ resulting from a central line average roughness $\sigma_3$ of said sliding surface of said cage and a central line average roughness $\sigma_4$ of said rolling surface of said roller is not more than 1 $\mu$mRa.

14. The roller bearing according to claim 13, wherein the sum of the concentration of sulfur, oxygen and titanium by weight in a steel material constituting one of said inner and outer rings is not more than 100 ppm.

15. The roller bearing according to claim 14, wherein said roller is one of a cylindrical roller and a tapered roller.

16. The roller bearing according to claim 13, wherein said roller is one of a cylindrical roller and a tapered roller.

17. A rolling bearing comprising an inner ring, an outer ring, a rolling element which is rotatably interposed between said inner and outer rings and has a rolling surface, and a cage (4) having a sliding surface (4a) which is brought in sliding contact with said rolling surface (1d) of said rolling element, in which the roughness $(\sigma_3^2+\sigma_4^2)^{1/2}$ resulting from a central line average roughness $\sigma_3$ of said sliding surface of said cage and a central line average roughness $\sigma_4$ of said rolling surface of said rolling element is not more than 1 $\mu$mRa.

18. The rolling bearing according to claim 17, wherein the sum of the concentration of sulfur, oxygen and titanium by weight in a steel material constituting one of said inner and outer rings is not more than 100 ppm.

19. The rolling bearing according to claim 17, wherein said rolling bearing is one of a roller bearing and a ball bearing.

* * * * *